United States Patent
Du et al.

(10) Patent No.: US 9,757,983 B1
(45) Date of Patent: Sep. 12, 2017

(54) TIRE WITH RUBBER COMPONENT CONTAINING REINFORCEMENT COMPRISED OF PRECIPITATED SILICA AND FUNCTIONALIZED GRAPHENE

(71) Applicant: The Goodyear Tire & Rubber Company, Akron, OH (US)

(72) Inventors: Ling Du, Fairlawn, OH (US); Xiaoping Yang, Streetsboro, OH (US); Carl Trevor Ross Pulford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/175,397

(22) Filed: Jun. 7, 2016

(51) Int. Cl.
| | |
|---|---|
| C08K 7/18 | (2006.01) |
| C08K 5/34 | (2006.01) |
| B60C 1/00 | (2006.01) |
| B60C 11/00 | (2006.01) |
| C08L 9/06 | (2006.01) |

(52) U.S. Cl.
CPC ........ B60C 1/0016 (2013.01); B60C 11/0008 (2013.01); C08L 9/06 (2013.01); B60C 2011/0025 (2013.01); C08L 2205/02 (2013.01)

(58) Field of Classification Search
CPC .................................. C08K 7/18; C08K 5/34
USPC ........................................ 524/575.5; 977/755
See application file for complete search history.

(56) References Cited

U.S. PATENT DOCUMENTS

| | | | |
|---|---|---|---|
| 6,476,154 | B1 | 11/2002 | Maly et al. |
| 9,162,530 | B2 | 10/2015 | Du et al. |
| 2006/0061011 | A1 | 3/2006 | Kikuchi et al. |
| 2010/0078194 | A1 | 4/2010 | Bhatt et al. |
| 2011/0146859 | A1 | 6/2011 | Schmitz et al. |
| 2014/0155544 | A1* | 6/2014 | Du .................... C08K 3/04 524/575.5 |

FOREIGN PATENT DOCUMENTS

| | | |
|---|---|---|
| DE | 102007056689 A1 | 5/2009 |
| JP | 2009046547 A | 3/2009 |
| KR | 100635604 B1 | 10/2006 |
| WO | 03060002 A1 | 7/2003 |

* cited by examiner

*Primary Examiner* — Deve E Valdez
(74) *Attorney, Agent, or Firm* — Henry C. Young, Jr.

(57) ABSTRACT

This invention relates to a tire having a rubber component, such as a tread. with filler reinforcement containing surface modified graphene and precipitated silica which may be or may include pre-hydrophobated precipitated silica.

20 Claims, No Drawings

TIRE WITH RUBBER COMPONENT CONTAINING REINFORCEMENT COMPRISED OF PRECIPITATED SILICA AND FUNCTIONALIZED GRAPHENE

FIELD OF INVENTION

This invention relates to a tire having a rubber component, such as a tread, with filler reinforcement containing surface modified graphene and precipitated silica which may be or may include pre-hydrophobated precipitated silica.

BACKGROUND OF THE INVENTION

It is sometimes desired to provide a tire with a rubber tread to promote reduced rolling resistance for the tire itself and thereby improved fuel economy for an associated vehicle, as well as reduced heat buildup in the tire tread during tire service to promote tire tread durability.

To promote one or more of such desirable properties, it is sometimes desired to promote a reduction in the hysteretic property of the tread rubber.

To promote a reduction in the hysteresis of the tread rubber (e.g. to promote a reduction in the rubber's physical rebound property), it may desired to significantly reduce its reinforcing carbon black filler content with an attendant increase in its precipitated silica filler content.

However, a significant reduction in rubber reinforcing carbon black content of the tread rubber, for example only up to 30 phr or even only up to 20 phr of rubber reinforcing carbon black, renders a significant reduction in its thermal and electrical conductivity particularly as the rubber reinforcing carbon black content falls below what is known as its percolation point. Such phenomenon is well known to those having skill in such art.

It would therefore be advantageous to provide a tread rubber composition with significantly reduced rubber reinforcing carbon black content but, nevertheless, to promote thermal conductivity and electrical conductivity for the tire tread rubber composition.

For such challenge, it is proposed to provide a very small content of graphene dispersion in the tread rubber composition to promote its thermal conductivity as well as its electrical conductivity.

However, adequate dispersion of the graphene filler in the tread rubber composition is desired and such dispersion may be challenging to achieve.

For such challenge, it is proposed to provide an inclusion of graphene filler in a tread rubber composition where the surface of the graphene is functionalized through non-damaging pi-pi ($\pi$-$\pi$) network interaction with a poly(phenylene ethynylene) oligomer containing a moiety promoting a pi-pi ($\pi$-$\pi$) bonding of the oligomer to the surface of the graphene to thereby functionalize the graphene and another different moiety of polysulfide for interaction with diene-based elastomers contained in the tread rubber composition. In this sense, then, the poly(phenylene ethynylene) oligomer may be considered as acting somewhat as a coupling agent to promote bonding of the graphene filler to the diene-based elastomer(s) in the tread rubber composition, and, further, to promote creation of a beneficial dispersion of the graphene filler in the tread rubber composition.

Historically, graphene has been suggested for inclusion in rubber compositions, including tire treads, for various purposes. For example, and not intended to be limiting, see Patent Publications: U.S. Pat. No. 6,476,154, US2006/0061011, US2010/0078194, US2011/0146859, WO2003/060002, DE 102007056689, JP2009/046547 and KR 100635604. It has also been proposed to functionalize carbon nanotubes for inclusion in a rubber composition by promoting pi-pi ($\pi$-$\pi$) bonding of compounds to their surface for use in rubber compositions. For example see U.S. Pat. No. 9,162,530.

In one embodiment, use of functionalized graphene in a diene-based elastomer containing rubber composition may be provided which contains particulate reinforcement in a form of combination of rubber reinforcing carbon black and precipitated silica (amorphous synthetic precipitated silica) together with a silica coupler for the precipitated silica.

In one embodiment, at least a portion of the precipitated silica may be provided as a pre-hydrophobated precipitated silica in a form of composite of precipitated silica pre-reacted with a silica coupling agent prior to its addition to the rubber composition.

The graphene is conventionally nano-sized particles in a sense of having an average thickness in a range of from about 1 nm to about 20 nm and an average L/D (lateral length to thickness dimension, or ratio) in a range of from about 10/1 to about 10,000/1.

Such graphene is conventionally prepared, for example, by a modified Hummers Method, in which natural graphite is treated with potassium permanganate and highly concentrated sulfuric acid. This reaction disrupts the delocalized electronic structure of graphite and imparts a variety of oxygen-based chemical functionalities to the surface, resulting in graphite oxide with a typical carbon-to-oxygen ratio of about 1.4 as measured by elemental analysis by combustion. The resulted graphite oxide is subsequently exfoliated either by a rapid thermal expansion at temperatures in the range of about 700° C. to 1200° C., or by chemical exfoliation followed by reduction through hydrazine.

As indicated, a significant aspect of this invention is to provide the graphene in a functionalized form to promote a thermally conductive property to the rubber composition and to rely on the precipitated silica, together with a coupling agent for the precipitated silica, without an appreciable rubber reinforcing carbon black content to provide reinforcement for the rubber composition. The functionalization of the graphene is envisioned as promoting its dispersion within the rubber composition and to promote rubber-to-filler (the graphene filler) bonding within the rubber composition to promote low rolling resistance and treadwear resistance for a tire tread rubber composition as well as to promote thermal conductivity for the rubber composition and thereby the tire tread, sidewall and other internal components such as a rubber chimney (radially extending rubber element) extending from the tread base rubber layer of a tire tread through an overlaying tread cap rubber layer to the outer tread cap rubber intended to be ground contacting.

It is believed that a tire with a component such as a tread which contains a minimal, if any, rubber reinforcing carbon black together while containing the aforesaid functionalized graphene content is a departure from past practice particularly when at least a portion of its precipitated silica filler reinforcement is a pre-hydrophobated precipitated silica (precipitated silica pre-hydrophobated prior to its addition to the rubber composition).

It is envisioned, in one embodiment, that the graphene may be coupled to the diene-based elastomer(s) of the rubber composition by a graphene coupling agent in the form of an oligomer to thereby rely on pi-pi ($\pi$-$\pi$) bonding of the graphene to the diene-based elastomer(s) and sulfur bonding to, or sulfur co-curing with, the diene based elastomer(s). There, the graphene coupling agent has a moiety with pi electron configuration to bond to the graphene and another different moiety comprised of a polysulfide based moiety to interact with carbon-to-carbon double bonds of the diene-based elastomer(s) of the rubber composition or comprised of a carbon-to-carbon double bond to sulfur co-cure with the diene-based elastomer(s).

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" and "uncured", unless otherwise indicated.

SUMMARY AND PRACTICE OF THE INVENTION

In accordance with this invention, a tire is provided with a component of a rubber composition (e.g. circumferential tread of a tread rubber composition) which comprises, based upon parts by weight per 100 parts by weight rubber (phr):

(A) 100 phr of at least one diene-based elastomer, (B) rubber reinforcing filler as a combination of rubber reinforcing carbon black, precipitated silica and graphene comprised of:

(1) from about 0 to about 30 phr, alternately from about 5 to about 20 phr, of rubber reinforcing carbon black, (2) from about 25 to about 125 phr, alternately from about 45 to about 100 phr, of precipitated silica, with silica coupler for said precipitated silica having a moiety reactive with hydroxyl groups (e.g. silanol groups) on the precipitated silica and another, different, moiety interactive with said diene-based elastomer(s), (3) about 0.5 to about 20, alternately from about 1 to about 10, phr of graphene treated with an phenylene ethynylene oligomer for said graphene comprised of a conjugated hydrocarbon backbone for forming a pi-pi (π-π) bonding thereof with the surface of said graphene, and having a branched polysulfide moiety for forming covalent bonding with the diene-based elastomer(s), wherein said oligomer is comprised of a compound of a chemical structure represented by at least one of Formula (1), Formula (2) and Formula (3):

Formula (1)

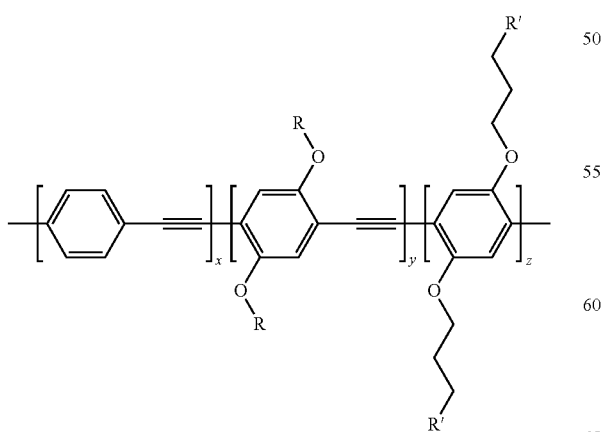

Chemical structure of graphene coupling agent

Formula (2)

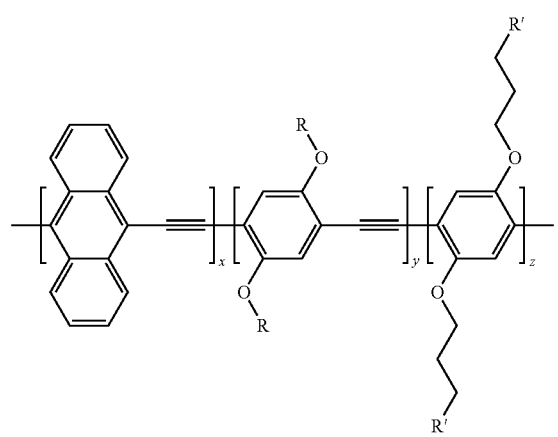

Chemical structure of graphene coupling agent

Formula (3)

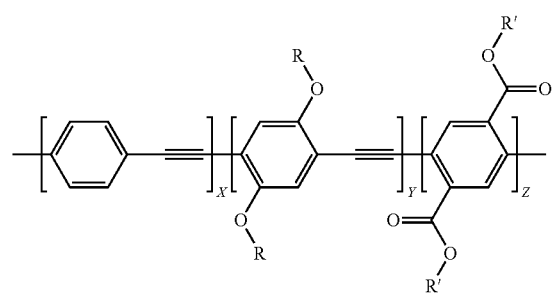

Chemical structure of graphene coupling agent wherein R is hydrocarbon group comprised of $C_nH_{2n+1}$; wherein n is a value in the range of 4 to 16; x is a value in a range of 0 to 10, y is a value in a range of 0 to 10 and z is a value in a range of 1 to 3; wherein at least one of x and y is a value of at least one; wherein R' is a 6 member saturated cyclic group which is comprised of carbon and sulfur atoms which contains 2 through 5 connecting sulfur atoms (e.g. contains 2 through 5 connecting sulfur atoms and from 1 to 4 carbon atoms).

The structural Formulas may be therefore be further illustrated with their polysulfide moieties. For example, Formula (3) may be represented as Formula (3A) with the cyclic group illustrated as containing 5 connecting sulfur atoms and Formula (3B) representing Formula (3A) where x equals zero:

Formula (3A)

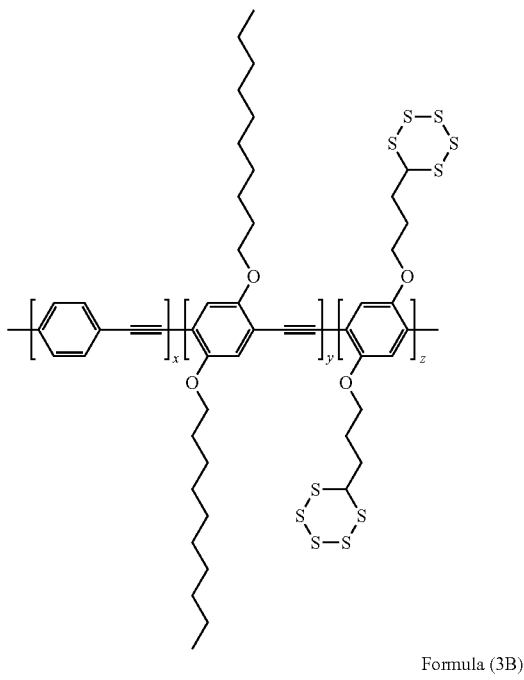

Formula (3B)

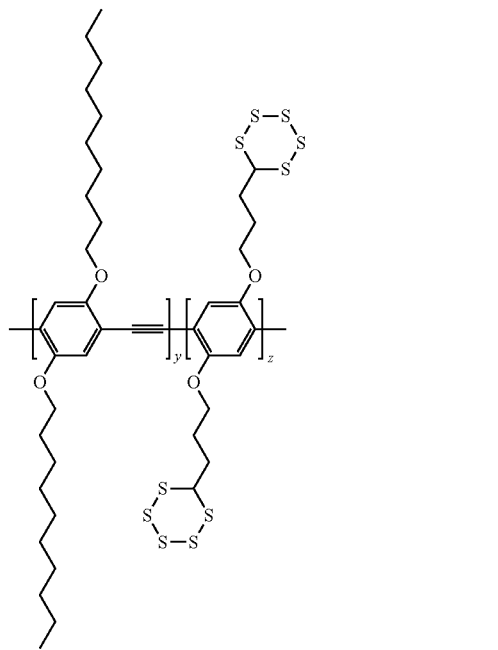

In one embodiment, said graphene has an average thickness in a range of from about 1 to about 20 nanometers (nm) and an L/D (lateral length over thickness) dimensional ratio in a range of from about 10 to about 1000.

In practice, various diene-based elastomers may be used for the rubber composition of said tread strip such as, for example, polymers and copolymers comprised of at least one monomer comprised of at least one of isoprene and 1,3-butadiene and from styrene copolymerized with at least one of isoprene and 1,3-butadiene.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In one aspect, the conjugated diene-based elastomer may be an elastomer such as, for example, styrene/butadiene copolymer containing at least one functional group reactive with hydroxyl groups on a precipitated silica such as, for example, comprised of at least one of siloxy, amine, imine and thiol groups, for example comprised of a siloxy and least one of amine and thiol groups.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica employed in this invention are typically aggregates obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 309 (1938), as well as ASTM D5604 for precipitated silica.

The silica may also be typically characterized by having a dibutylphthalate (DBP) absorption value in a range of about 50 to about 400 cc/100 g, and more usually about 100 to about 300 cc/100 g (ASTM D2414).

Various commercially available precipitated silicas may be considered for use in this invention such as, only for example herein, and without limitation, silicas from PPG Industries under the Hi-Sil trademark with designations Hi-Sil 210, Hi-Sil 243, etc and Agilon trademark with designation of Agilon 400G-D; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

Various coupling agents, as previously described, may be used if desired to aid in coupling the silica (e.g. precipitated silica with hydroxyl groups on its surface), as well as interacting with the aforesaid functionalized graphene.

In one embodiment, the precipitated silica and silica coupler, or at least a portion thereof, may be provided as a pre-reacted precipitated silica with said silica coupler (prior to addition to the rubber composition) and such pre-reacted precipitated silica may be referred to herein as a pre-hydrophobated precipitated silica.

In one embodiment, said silica coupler may be at least one of bis(3-trialkoxysilylpropyl) polysulfide containing an average of from about 2 to about 4 connecting sulfur atoms in its polysulfidic bridge and alkoxyorganomercaptosilane, particularly an alkoxyorganomercaptosilane.

Representative of a bis(3-trialkoxysilylpropyl) polysulfide is bis(3-triethoxysilylpropyl) polysulfide.

Representative of various organomercaptosilanes are, for example and not intended to be limiting, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In one embodiment, in addition to said pre-reacted precipitated silica, a precipitated silica may be added to said rubber composition to react with silica coupler in situ within the rubber composition.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing fillers materials such as, for example, the aforementioned rubber reinforcing carbon black and precipitated silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may, for example, comprise about 0.5 to about 10 phr, usually about 1 to about 5 phr. Typical amounts of processing aids, if used, may comprise, for example from about 1 to about 50 phr. Such processing aids can include, for example and where appropriate, aromatic, napthenic, and/or paraffinic processing oils. Typical amounts of antioxidants where used may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants, where used, may comprise for example about 1 to 5 phr. Typical amounts of fatty acids, if used, which can include stearic acid and combinations of stearic acid with one or more of palmitic acid oleic acid and may comprise, for example, from about 0.5 to about 3 phr. Typical amounts of zinc oxide may comprise, for example, from about 1 to about 10 phr. Typical amounts of waxes, such as for example microcrystalline waxes, where used, may comprise, for example, from about 1 to about 5 phr. Typical amounts of peptizers, where used, may comprise, for example, from about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may be used, for example, in an amount ranging from about 0.5 to about 4 phr, or even, in some circumstances, up to about 8 phr.

Sulfur vulcanization accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging, for example, from about 0.5 to about 4, alternately about 0.8 to about 1.5 phr.

In another embodiment, combinations of a primary and a secondary accelerator might be used with the secondary accelerator, where used, being usually used in smaller amounts (for example about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used, for example, which are not affected by normal processing temperatures but produce a satisfactory cure at ordinary vulcanization temperatures. Vulcanization retarders might also be used, where desired or appropriate. Suitable types of accelerators that may be used in the present invention may be, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator may be, for example, a guanidine, dithiocarbamate or thiuram compound.

The presence and relative amounts of the above additives are not considered to be an aspect of the present invention, unless otherwise indicated herein, which is more primarily directed to the utilization of functionalized exfoliated graphene platelets in a rubber composition, particularly for tire component.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and reinforcing fillers, including the exfoliated graphene platelets and alternative additional reinforcing fillers such as, for example precipitated silica and rubber reinforcing carbon black mixed in one or more non-productive mix stages. The terms "non-productive" and "productive" mix stages are well known to those having skill in the rubber mixing art.

The following Example is presented to illustrate one aspect of the invention and is not intended to be limiting. The parts and percentages are by weight unless otherwise designated.

EXAMPLE I

An exemplary Control rubber Sample A, Comparative rubber Sample B, Experimental rubber Sample C and Comparative rubber Sample D are provided to illustrate preparation of rubber compositions.

Control rubber Sample A is composed of diene-based elastomers and reinforcing filler as precipitated silica with a minimal content of carbon black.

Comparative rubber Sample B is similar to Control rubber Sample A except that it contains the 5 phr of carbon nanotubes (CNT) pretreated with the poly(phenylene ethynylene) oligomer and reduced loading level of precipitated silica.

Experimental rubber Sample C is similar to Comparative rubber Sample B except that it contained 5 phr graphene platelets pretreated with the poly(phenylene ethynylene) oligomer (GP) instead of the pretreated carbon nanotubes.

Comparative rubber Sample D is similar to Experimental rubber Sample C except that it contained a significant content of rubber reinforcing carbon black instead of the graphene.

In this example, the coupling agent used to pretreat the graphene is comprised of the chemical structure illustrated by Formula (3B) as a derivation of Formula (3A) were x equals zero:

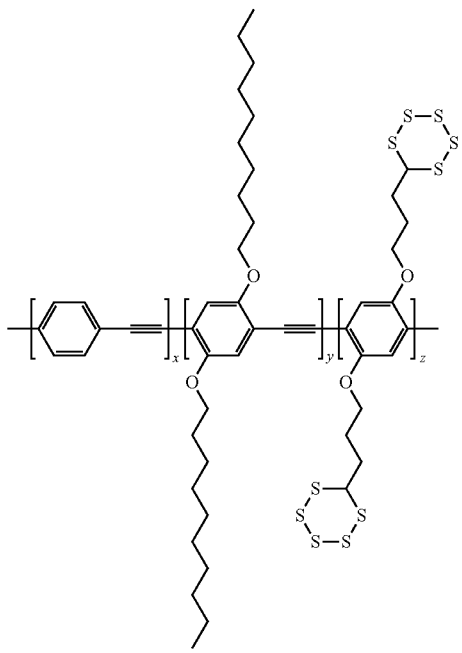

Formula (3A)

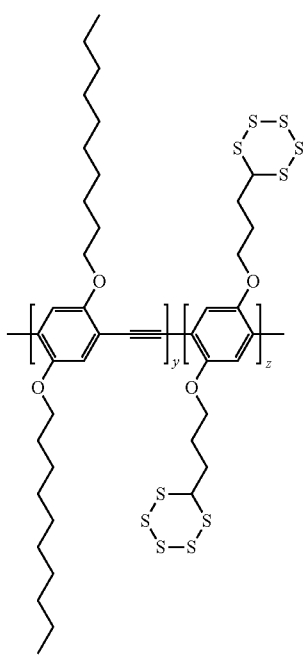

Formula (3B)

wherein, x equals 0; y is in the range of 3 to 10, z is in the range of 1 to 3, and the cyclic R' contains about 5 connecting sulfur atoms and 1 carbon atom, as illustrated by Formula (3B).

The basic formulation for the rubber Samples is illustrated in the following Table 1 where the ingredients are expressed in terms of parts by weight per 100 parts of rubber (phr) unless otherwise indicated.

The rubber compositions may be prepared, for example, by mixing the ingredients in at least two sequential preparatory (non-productive) mixing steps (e.g. NP1 and NP2) at an elevated temperature without sulfur and sulfur cure accelerators which are thereafter added in a final (productive) mixing step (PR) usually at a lower mixing temperature. The rubber composition may then sheeted out and cooled to below 50° C. between each of the non-productive mixing steps and prior to the productive mixing step. Rubber mixing steps involving non-productive and productive mixing steps are generally well known to those having skill in such art.

TABLE 1

|  | Parts (phr) | | | |
| --- | --- | --- | --- | --- |
|  | Control A | Compound B (CNT) | Experimental C (GP) | Compound D |
| Non-Productive Mixing Step (NP1) | | | | |
| SSBR rubber (styrene/butadiene rubber)[1] | 70 | 70 | 70 | 70 |
| Cis 1,4-polybutadiene rubber[2] | 30 | 30 | 30 | 30 |
| Carbon black, rubber reinforcing (N120)[3] | 5.2 | 1.2 | 1.2 | 70 |
| Precipitated silica[4] | 65 | 50 | 50 | 0 |
| Silica coupler[5] | 5.2 | 4 | 4 | 0 |
| Wax, crystalline and paraffin | 1.5 | 1.5 | 1.5 | 1.5 |
| Rubber processing oil | 20 | 20 | 20 | 20 |
| Antioxidant(s) | 2.2 | 2.2 | 2.2 | 2.2 |
| Graphene (pretreated) | 0 | 0 | 5 | 0 |
| Carbon nanotube (pretreated) | 0 | 5 | 0 | 0 |
| Zinc oxide | 3.5 | 3.5 | 3.5 | 3.5 |
| Fatty acid[6] | 2 | 2 | 2 | 2 |
| Productive Mixing Step (PR) | | | | |
| Sulfur | 1.7 | 1.7 | 1.7 | 1.7 |
| Accelerator(s)[7] | 1.6 | 1.6 | 1.6 | 1.6 |
| Diphenylguandine (DPG) | 1.5 | 1.5 | 1.5 | 0 |

[1]Styrene/butadiene elastomer (SSBR) prepared by solvent solution polymerization, tin coupled and end-functionalized with what is understood to be alkoxy and a combination of amine and thiol functional groups and having a styrene content of about 21 percent rubber as SLR4606 ™ from Trinseo
[2]Cis 1,4-polybutadiene rubber as BUD1223 ™ from The Goodyear Tire & Rubber Company
[3]Rubber reinforcing carbon black as N120, an ASTM designation
[4]Precipitated silica as Zeosil 1165MP ™ from Solvay
[5]Silica coupler comprised of a bis(3-triethoxysilylpropyl) polysulfide containing an average from about 2 to about 2.6 connecting sulfur atoms in its polysulfidic bridge as Si266 ™ from Evonik
[6]Mixture of fatty acids comprised of stearic, palmitic and oleic acids
[7]Sulfenamide sulfur cure accelerator The carbon nanotubes were obtained as Graphistrength C100™ a product from Arkema; the graphene as N002001-P™ a product from Angstron Materials and oligomer as Kentera™ a product from Zyvex.

The following Table 2 represents the uncured and cured behavior and various physical properties of the rubber compositions based upon the basic formulation of Table 1 and reported for rubber Samples A, B, C and D.

TABLE 2

| | Samples (phr) | | | |
|---|---|---|---|---|
| | Control A | Compound B (CNT) | Experimental C (GP) | Compound D |
| Non-Productive Mixing Step (NP1) | | | | |
| SSBR elastomer | 70 | 70 | 70 | 70 |
| Cis 1,4-polybutadiene rubber | 30 | 30 | 30 | 30 |
| Rubber reinforcing carbon black | 5.2 | 5.2 | 5.2 | 70 |
| Precipitated silica | 65 | 50 | 50 | 0 |
| Graphene, pretreated | 0 | 0 | 5 | 0 |
| Carbon nanotube, pretreated | 0 | 5 | 0 | 0 |
| Silica coupler | 5.2 | 4 | 4 | 0 |
| Properties | | | | |
| RPA test (Rubber Process Analyzer), 10% strain, 11 Hertz, 100° C. | | | | |
| Storage modulus G' (MPa) | 2.03 | 2.28 | 1.76 | 3.47 |
| Tan delta | 0.12 | 0.09 | 0.07 | 0.17 |
| Rebound (100° C.), (higher is better) (percent) | 65 | 70 | 74 | 57 |
| DIN abrasion (lower is better)[1] | 104 | 104 | 131 | 128 |
| Stress-strain | | | | |
| Tensile strength (MPa) | 15 | 14 | 13 | 18 |
| Elongation at break (%) | 401 | 360 | 376 | 377 |
| 300% modulus, ring, (MPa) | 11 | 12 | 11 | 15 |
| Cure: MDR test, 150° C. | | | | |
| Delta torque (dN-m) | 15.6 | 16.9 | 16.2 | 17.3 |
| T25 (minutes) | 5.1 | 3.7 | 4.5 | 3.2 |
| T90 (minutes) | 10.2 | 6.9 | 7.6 | 6.2 |
| Thermal Conductivity | | | | |
| Thermal conductivity (W/m/K) | 0.267 | 0.287 | 0.343 | 0.311 |
| Thermal diffusivity (mm²/s) (transmission rate) | 0.142 | 0.161 | 0.224 | 0.173 |

[1]DIN53516, relative volume loss

It can be seen from Table 2 that the addition of 5 phr of the treated graphene in Experimental rubber Sample C to replace 15 phr of the precipitated silica of Control rubber Sample A (reduction of 65 to 50 phr of precipitated silica) significantly and beneficially reduced the hysteresis of the rubber composition as evidenced by the increased 100° C. rebound value of 74 percent from a value of 65 percent for Control rubber Sample A which is about a 14 percent beneficial improvement for Experimental rubber Sample C.

It can further be seen from Table 2 that the addition of 5 phr of the treated graphene significantly and beneficially increased the thermal conductivity to a value of 0.343 for Experimental rubber Sample C as compared to a value of 0.267 for Control rubber Sample A which is about a 29 percent improvement.

It is also seen that the treated graphene is much more effective in improving the thermal conductivity (Experimental rubber Sample C) than the carbon nanotube (Comparative rubber Sample C) and carbon black reinforcement (Comparative rubber Sample D).

Therefore, it is concluded that rather minimal amount of addition of the pretreated graphene to the rubber composition can significantly and beneficially improve (increase) the hot rebound (100° C.) physical property of the rubber composition to therefore improve (reduce) predictive rolling resistance for a tire with tread of Experimental rubber Sample C as well as improve (increase) the rubber composition's thermal conductivity.

While various embodiments are disclosed herein for practicing the invention, it will be apparent to those skilled in this art that various changes and modifications may be made therein without departing from the spirit or scope of the invention.

What is claimed is:

1. A tire with a component of a rubber composition which comprises, based upon parts by weight per 100 parts by weight rubber (phr):

(A) 100 phr of at least one diene-based elastomer, (B) rubber reinforcing filler as a combination of rubber reinforcing carbon black, precipitated silica and graphene comprised of:

(1) from about 0 to about 30 phr of rubber reinforcing carbon black, (2) from about 25 to about 125 phr of precipitated silica, with silica coupler for said precipitated silica having a moiety reactive with hydroxyl groups on the precipitated silica and another, different, moiety interactive with said diene-based elastomer(s), (3) about 0.5 to about 20 phr of graphene, treated with a phenylene ethynylene oligomer comprised of a conjugated hydrocarbon backbone and having a branched polysulfide moiety, wherein said oligomer is comprised of a compound of a chemical structure represented by at least one of Formula (1), (2) and (3):

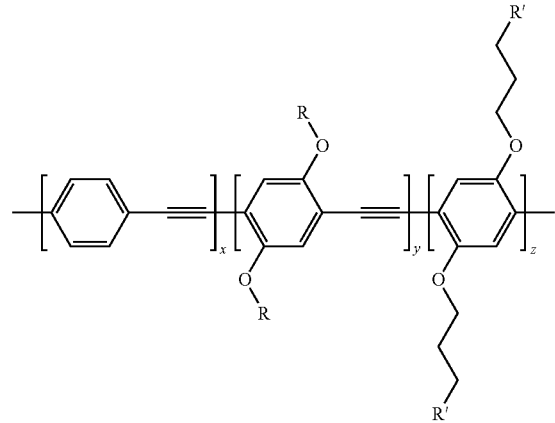

Formula (1)

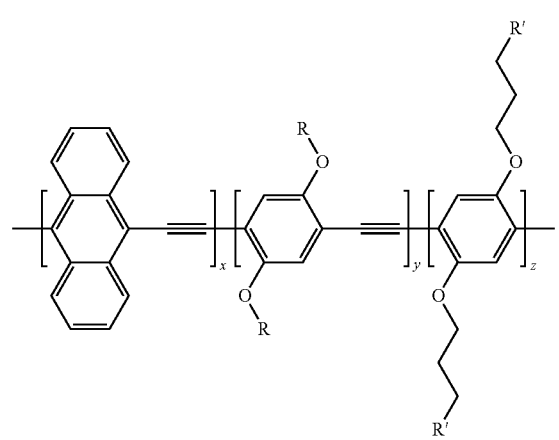

Formula (2)

Formula (3)

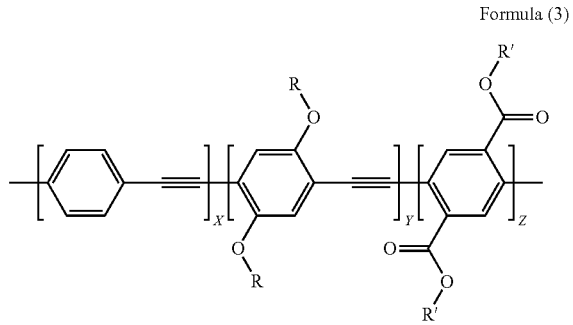

wherein R is comprised of hydrocarbon, $C_nH_{2n+1}$; where n is in the range of 4 to 16, x is in a range of 0 to 10, y is in a range of 0 to 10; and z is in a range of 1 to 3; wherein at least one of x and y is at least 1; wherein R' is a cyclic six member saturated ring comprised of sulfur and carbon atoms which contains from 2 through 5 connecting sulfur atoms and from 1 through 4 carbon atoms.

2. The tire of claim 1 wherein said graphene has an average thickness in a range of from about 1 to about 20 nanometers (nm) and a L/D (lateral length over thickness) dimensional ratio in a range of from about 10 to about 1000.

3. The tire of claim 1 where, for the tread rubber composition, the said diene-based elastomer is comprised of at least one polymer of at least one monomer selected from isoprene and 1,3-butadiene and from styrene copolymerized with at least one of isoprene and 1,3-butadiene.

4. The tire of claim 2 where, for the tread rubber composition, the said diene-based elastomer is comprised of at least one polymer of at least one monomer selected from isoprene and 1,3-butadiene and from styrene copolymerized with at least one of isoprene and 1,3-butadiene.

5. The tire of claim 1 where, for the tread rubber composition, the diene-based rubber is natural cis 1,4-polyisoprene rubber.

6. The tire of claim 1 where, for the tread rubber composition, the diene-based rubber is natural cis 1,4-polyisoprene rubber together with at least one synthetic rubber.

7. The tire of claim 1 wherein, for said tread rubber composition, at least one of said diene-based elastomer(s) is least one of tin coupled organic solution polymerization prepared styrene/butadiene copolymers, isoprene/butadiene copolymers, styrene/isoprene copolymers, polybutadiene and styrene/isoprene/butadiene terpolymers.

8. The tire of claim 7 wherein, for said tread rubber composition, said tin coupled diene-based elastomer is an organic solution polymerization prepared styrene/butadiene copolymer.

9. The tire of claim 1 wherein, for said rubber composition, the diene-based elastomer contains at least one functional group reactive with hydroxyl groups on a precipitated silica wherein said functional group is comprised of at least one of siloxy, amine, imine and thiol groups.

10. The tire of claim 8 wherein said tin coupled butadiene/styrene rubber contains at least one functional group reactive with hydroxyl groups on a precipitated silica wherein said functional group is comprised of at least one of siloxy, amine, imine and thiol groups.

11. The tire of claim 1 wherein said precipitated silica and silica coupler are provided as a composite of precipitated silica pre-reacted with said silica coupler and where said silica coupler is comprised of at least one of bis(3-trialkoxysilylpropyl) polysulfide containing an average of from about 2 to about 4 connecting sulfur atoms in its polysulfidic bridge and alkoxyorganomercaptosilane.

12. The tire of claim 11 wherein said composite of pre-reacted precipitated silica is the product of precipitated silica and bis(3-triethoxysilylpropyl) polysulfide.

13. The tire of claim 11 wherein said composite of pre-reacted precipitated silica is the product of precipitated silica and alkoxyorganomercaptosilane.

14. The tire of claim 1 wherein precipitated silica is added to said rubber composition to react with said coupling agent in situ within the rubber composition.

15. The tire of claim 11 wherein precipitated silica is also added to said rubber composition to react with coupling agent in situ within the rubber composition.

16. The tire of claim 1 wherein said oligomer is comprised of the oligomer of Formula (1).

17. The tire of claim 1 wherein said oligomer is comprised of the oligomer of Formula (2).

18. The tire of claim 1 wherein said oligomer is comprised of the oligomer of Formula (3).

19. The tire of claim 1 wherein said component is a circumferential tread.

20. The tire of claim 10 wherein said component is a circumferential tread.

* * * * *